(12) United States Patent
Hashizume

(10) Patent No.: US 10,312,755 B2
(45) Date of Patent: Jun. 4, 2019

(54) MOTOR

(71) Applicant: NIDEC CORPORATION, Minami-ku, Kyoto (JP)

(72) Inventor: Naohiro Hashizume, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 195 days.

(21) Appl. No.: 15/054,687

(22) Filed: Feb. 26, 2016

(65) Prior Publication Data

US 2016/0254714 A1 Sep. 1, 2016

(30) Foreign Application Priority Data

Feb. 27, 2015 (JP) ................................. 2015-039135

(51) Int. Cl.
*H02K 1/27* (2006.01)
(52) U.S. Cl.
CPC .................... *H02K 1/2773* (2013.01)
(58) Field of Classification Search
CPC ............ H02K 1/04; H02K 1/27; H02K 1/277; H02K 1/2773; H02K 1/278; H02K 1/28
See application file for complete search history.

(56) References Cited

U.S. PATENT DOCUMENTS

| | | | | |
|---|---|---|---|---|
| 3,979,821 A | * | 9/1976 | Noodleman | H02K 13/006 148/108 |
| 4,260,921 A | * | 4/1981 | Silver | H02K 1/278 310/156.19 |
| 4,336,649 A | | 6/1982 | Glaser | |
| 4,354,126 A | * | 10/1982 | Yates | H02K 1/2773 310/156.59 |
| 4,504,755 A | * | 3/1985 | Semones | H02K 1/2773 310/156.23 |
| 5,452,590 A | * | 9/1995 | Vigili | D04B 15/99 310/156.57 |

(Continued)

FOREIGN PATENT DOCUMENTS

| | | |
|---|---|---|
| CN | 102957237 A | 3/2013 |
| DE | 102010030326 A1 | 12/2011 |

(Continued)

OTHER PUBLICATIONS

SIPO Office Action corresponding to CN Application No. 201510725031.8; dated Dec. 4, 2017.

(Continued)

*Primary Examiner* — Tran N Nguyen
(74) *Attorney, Agent, or Firm* — Cantor Colburn LLP (57) ABSTRACT

A motor may include a rotor comprising a shaft; a stator; and a bearing supporting the shaft. The rotor may include a plurality of core piece parts arranged along a circumferential direction; and a plurality of permanent magnets arranged between neighboring core piece parts. The permanent magnets may include two magnetic poles, and the magnetic poles of neighboring permanent magnets being arranged such that magnetic poles with identical polarity face each other in the circumferential direction. The core piece parts may include a concave portion, and two protrusions which are disposed on both sides of the concave portion and protrude radially inward. The protrusions may a portion located on a radially inner side from the first segment when viewed in an axial direction.

6 Claims, 4 Drawing Sheets

(56) References Cited

U.S. PATENT DOCUMENTS

| | | | |
|---|---|---|---|
| 6,794,784 B2 | 9/2004 | Takahashi et al. | |
| 7,205,695 B2 * | 4/2007 | Smith | G01N 29/041 |
| | | | 310/156.38 |
| 7,612,480 B2 | 11/2009 | Fujii et al. | |
| 8,729,767 B2 * | 5/2014 | Feuerrohr | H02K 1/2773 |
| | | | 310/216.069 |
| 9,178,394 B2 | 11/2015 | Asahi et al. | |
| 9,419,482 B2 | 8/2016 | Lee et al. | |
| 2002/0047425 A1 | 4/2002 | Coupart et al. | |
| 2004/0212266 A1 * | 10/2004 | Hans | H02K 1/2766 |
| | | | 310/156.56 |
| 2008/0024018 A1 * | 1/2008 | Rignault | H02K 1/2773 |
| | | | 310/424 |
| 2011/0121668 A1 | 5/2011 | Condamin et al. | |
| 2012/0038237 A1 * | 2/2012 | Li | H02K 1/146 |
| | | | 310/156.45 |
| 2013/0049493 A1 * | 2/2013 | Zhao | H02K 1/2773 |
| | | | 310/43 |
| 2013/0057103 A1 * | 3/2013 | Han | H02K 1/2773 |
| | | | 310/156.12 |
| 2013/0187486 A1 * | 7/2013 | Lee | H02K 5/02 |
| | | | 310/43 |
| 2013/0207507 A1 * | 8/2013 | Han | H02K 15/03 |
| | | | 310/216.007 |
| 2013/0241324 A1 * | 9/2013 | Mader | H02K 1/28 |
| | | | 310/45 |
| 2014/0300243 A1 | 10/2014 | Berkouk et al. | |
| 2014/0306569 A1 | 10/2014 | Kojima et al. | |

FOREIGN PATENT DOCUMENTS

| | | |
|---|---|---|
| JP | S6370275 U | 5/1988 |
| JP | H04068449 U1 | 6/1992 |
| JP | H7312852 A | 11/1995 |
| JP | 2000175388 A | 6/2000 |
| JP | 2002010600 A | 1/2002 |
| JP | 2007174822 A | 7/2007 |
| JP | 2011524735 A | 9/2011 |
| JP | 2013051796 A | 3/2013 |
| JP | 5212680 B2 | 6/2013 |
| JP | 2013219948 A | 10/2013 |
| JP | 2014036457 A | 2/2014 |
| KR | 1019980069557 P | 10/1998 |
| KR | 20130027417 A | 3/2013 |
| KR | 20130085337 A | 7/2013 |
| WO | 2008078584 A1 | 7/2008 |

OTHER PUBLICATIONS

JPO Office Action corresponding to Application No. 2015-039135; dated Oct. 9, 2018.

U.S. Notice of Allowance for related U.S. Appl. No. 15/052,285, dated Jan. 8, 2018.

* cited by examiner

MOTOR

CROSS REFERENCE TO RELATED APPLICATION

The present invention claims priority under 35 U.S.C. § 119 to Japanese Application No. 2015-039135 filed Feb. 27, 2015, the entire content of which is incorporated herein by reference.

FIELD OF THE DISCLOSURE

The present disclosure relates to a motor.

BACKGROUND

For example, Japanese Utility Model Application Publication No. S63-70275 describes a permanent magnet generator having a plurality of plate shape permanent magnets radially arranged on an outer circumference of a non-magnetic axis, and a magnetic pole formed by disposing a core, which has a fan shape in cross section, between the plate shape permanent magnets. The permanent magnet generator disclosed in Japanese Utility Model Application Publication No. S63-70275 has an object of reducing leakage of magnetic flux that passes between adjacent poles through the non-magnetic shaft, and a V-shaped notch portion is provided on an inner diameter side of the magnetic pole core.

However, in the permanent magnet generator (motor) as described above, the circumferential width of the magnetic core (core piece part) is smaller at an end portion on a radially inner side of the V-shaped notch portion. For this reason, a technical problem has been raised since the magnetic flux is saturated inside the magnetic pole core, and thereby the magnetic flux is easily leaked to the V-shaped notch portion side. Accordingly, in the permanent magnet generator as described above, the magnetic flux, which is leaked to a radially inner side of the magnetic pole core, could not be sufficiently reduced.

SUMMARY

One example of the present disclosure is a motor comprising a rotor which has a shaft having its center on a vertically extending center axis, a stator which is disposed at a radially outer side of the rotor, and a bearing which supports the shaft. The rotor has a plurality of core piece parts which are arranged along a circumferential direction, and a plurality of permanent magnets which are respectively disposed between the neighboring core piece parts in the circumferential direction, and magnetize the core piece parts. The permanent magnet has two magnetic poles arranged along the circumferential direction. The magnetic poles of the circumferentially neighboring permanent magnets are arranged such that magnetic poles with identical polarity face each other in the circumferential direction. The core piece part has a concave portion where a surface on a radially inner side is recessed toward a radially outer side, and two protrusion portions which are disposed on both circumferential sides of the concave portion and protrude radially inward respectively along each of the neighboring permanent magnets. When a segment connecting an end portion on a radially inner side of a surface of the protrusion which faces the permanent magnet in the circumferential direction and an end portion on a radially outer side of the concave portion is set to a first segment, the protrusions have a portion located on a radially inner side from the first segment when viewed in an axial direction.

According to one example of a motor according to the present disclosure, leakage flux can be reduced.

The above and other elements, features, steps, characteristics and advantages of the present disclosure will become more apparent from the following detailed description of the embodiments with reference to the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Herein, a motor according to an exemplary embodiment of the present disclosure will be described with reference to the drawings. However, it should be noted that the scope of the present disclosure is not limited to the below embodiment, and can be appropriately altered without departing from the scope of the technical concept of the present disclosure. Also, in the following drawings, each structure may have different dimensions or sizes from the actual structure, in order to clearly illustrate each constitution.

Figure 1:
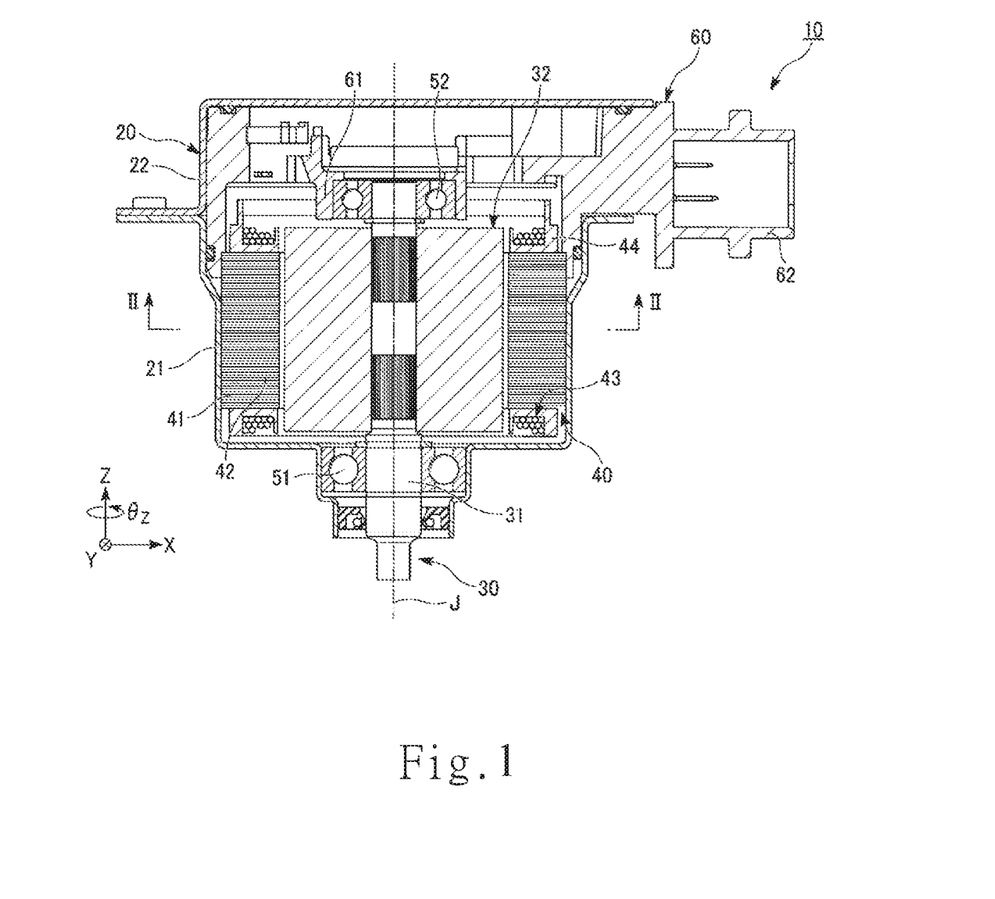
FIG. 1 is a cross-sectional view of a motor according to an embodiment.

In addition, in the drawings, an X-Y-Z coordinate system is provided as an appropriate 3-dimensional orthogonal coordinates system. In the X-Y-Z coordinate system, a direction parallel to the axial direction of the center axis J shown in FIG. 1 is referred to as the z-axis direction. A direction perpendicular to the z-axis direction, that is, the left and right directions of FIG. 1, is referred to as the x-axis direction. A direction perpendicular to both the x-axis direction and the z-axis direction is referred to as the y-axis direction. Also, a circumferential direction having its center on the center axis J is referred to as the θZ direction. As to the θZ direction, a clockwise direction when viewed toward the +Z side from the −Z side is referred to as the positive direction, and a counter clockwise direction when viewed toward the +Z side from the −Z side is referred to as the negative direction.

Moreover, herein, a direction in which the center axis J extends (z-axis direction) is referred to as the vertical direction. The positive side of the z-axis direction (+Z side) is referred to as the "upper side," and the negative side of the z-axis direction (−Z side) is referred to as the "lower side." It is to be understood that the descriptions of the vertical direction, the upper side and the lower side are used for explanation only, and they do not limit the actual positional relation or direction. Also, unless otherwise explained, a direction parallel to the center axis J (z-axis direction) is simply referred to as the "axial direction," a radial direction having its center on the center axis J is simply referred to as the "radial direction," and a circumferential direction having its center on the center axis J (θZ direction), that is, the axial circumference of center axis J, is simply referred to as the "circumferential direction."

Further, a direction along the positive direction of the θZ direction (+θZ side, one circumferential direction) is referred to as the "driving side," and the direction along the negative direction of the θZ direction (−θZ side, the other circumferential direction) is referred to as the "counter driving side." Also, it is to be understood that the descriptions of the driving and counter driving sides are used for explanation only, and they do not limit the actual driving direction.

Furthermore, herein, descriptions such as being axially extended do not only refer to a case of strictly being extended in the axial direction (z-axis direction), but it may also include a case of being extended in a direction inclined at less than 45° relative to the axial direction. Also, descriptions such as being radially extended do not only refer to a case of strictly being extended in the radial direction, that is, the direction perpendicular to the axial direction (z-axis direction), but it may also include a case of being extended in a direction inclined at less than 45° relative to the radial direction.

FIG. 1 is a cross-sectional view of a motor 10 of this embodiment. As shown in FIG. 1, the motor 10 includes a housing 20, a rotor 30 having a shaft 31, a stator 40, a lower bearing 51, an upper bearing 52, and a bus bar unit 60.

The housing 20 is a casing having a cylindrical portion. The housing 20 receives the rotor 30, the stator 40, the lower bearing 51, the upper bearing 52, and the bus bar unit 60. The housing 20 has a lower housing 21, and an upper housing 22. The lower housing 21 has a cylindrical shape which is open on both sides in the axial direction (±Z side). The upper housing 22 is fixed to an end portion of the upper side (+Z side) of the lower housing 21. The upper housing 22 covers upper sides of the rotor 30 and the stator 40.

The stator 40 is retained inside the lower housing 21. The stator 40 is disposed at a radially outer side of the rotor 30. The stator 40 has a core back portion 41, a teeth portion 42, a coil 43, and a bobbin 44. The core back portion 41 has, for example, a cylindrical shape concentric with the center axis J. The outer surface of the core back portion 41 is fixed to the inner surface of the lower housing 21.

The teeth portion 42 extends from the inner surface of the core back portion 41 toward the shaft 31. Although it is omitted from the drawings, a plurality of teeth portions 42 are provided and arranged at equal intervals in the circumferential direction. The bobbin 44 is mounted on each teeth portion 42. The coil 43 is wound around each teeth portion 42 via the bobbin 44. In this embodiment, the core back portion 41 and the teeth portion 42 are made of a stack of laminated steel plates which is formed by laminating a plurality of electromagnetic steel plates.

The bus bar unit 60 is disposed at an upper side (+Z side) of the stator 40. The bus bar unit 60 has a connector portion 62. An external power source, which is not shown in the drawings, is connected to the connector portion 62. The bus bar unit 60 has a wiring member which is electrically connected with the coil 43 of the stator 40. One end of the wiring member is exposed to the exterior of the motor 10 via the connector portion 62. Accordingly, power is supplied from the external power source to the coil 43 through the wiring member. The bus bar unit 60 has a bearing support portion 61.

The lower bearing 51 and the upper bearing 52 support the shaft 31. The lower bearing 51 is disposed at a lower side (−Z side) than the stator 40. The lower bearing 51 is retained in the lower housing 21. The upper bearing 52 is disposed at an upper side (+Z side) than the stator 40. The upper bearing 52 is retained in the bearing support portion 61 of the bus bar unit 60.

The rotor 30 has a shaft 31, and a rotor body unit 32. The shaft 31 has its center on the center axis J which extends in the vertical direction (z-axis direction). In this embodiment, the shaft is a member having a cylindrical shape. The shaft may be a solid type member or a hollow type cylindrical member. The rotor body unit 32 is disposed at a radially outer side of the shaft 31. In this embodiment, the rotor body unit 32 is fixed to an outer circumferential surface of the shaft 31. In this embodiment, the rotor 30 rotates, for example, in the counter clockwise direction about the center axis J when viewed from the upper side (+Z side), that is, from the counter driving side (−θZ side) to the driving side (+θZ side).

Figure 2:
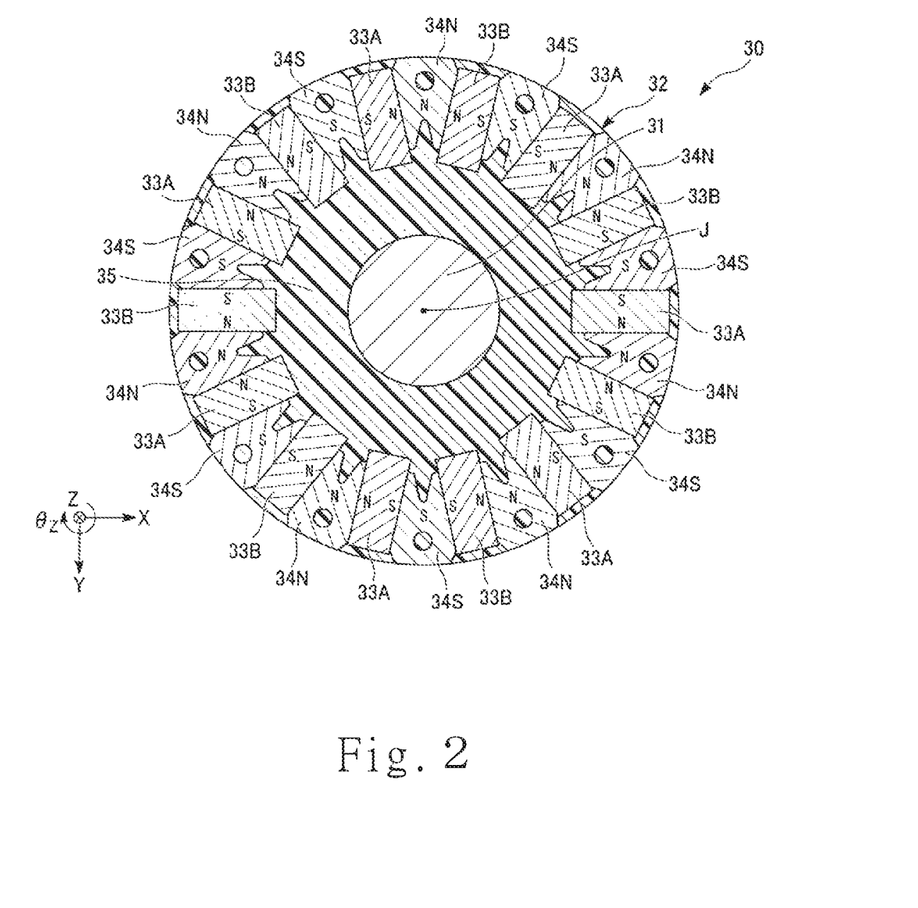
FIG. 2 illustrates a rotor according to the embodiment, and shows a cross-sectional view taken along the II-II line in FIG. 1.
Figure 3:
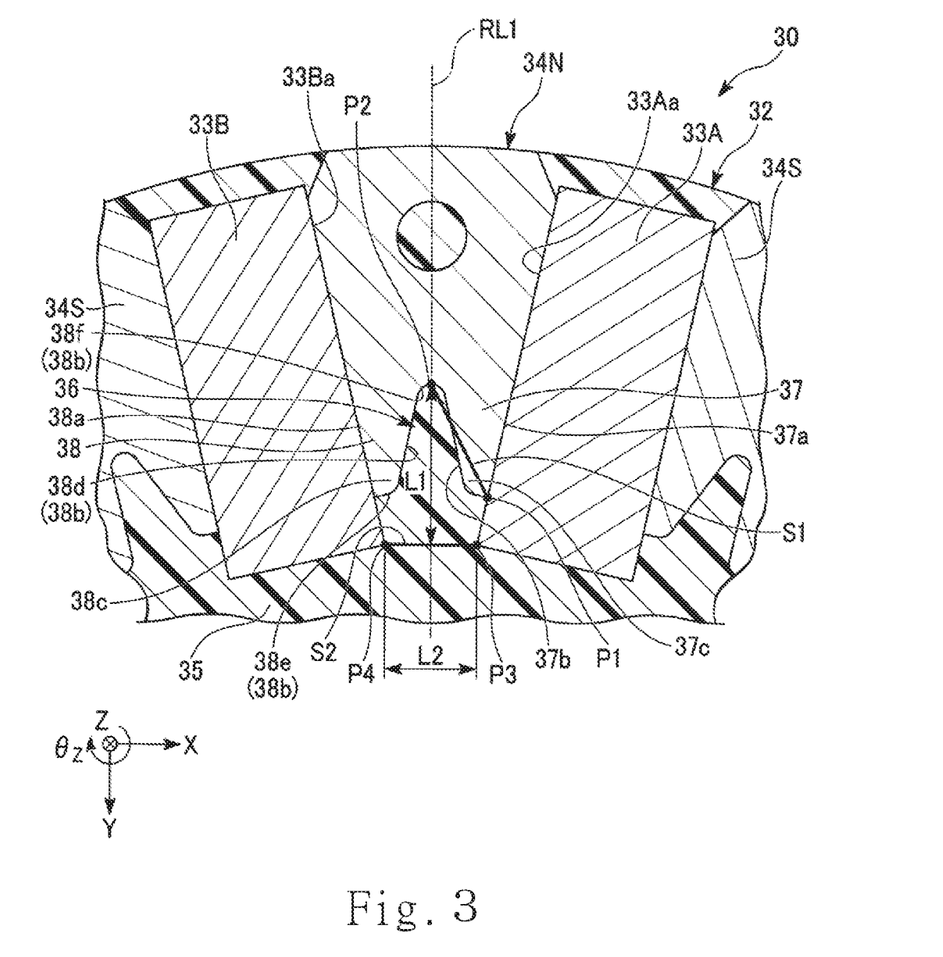
FIG. 3 is a cross-sectional view which illustrates a portion of the rotor according to the embodiment, and is a partially enlarged view of FIG. 2.

FIG. 2 illustrates the rotor 30, and shows a cross-sectional view taken along the II-II line from FIG. 1. FIG. 3 is a partially enlarged view of FIG. 2. The rotor body unit 32 has, as shown in FIG. 2, a plurality of permanent magnets 33A, 33B, a plurality of core piece parts 34N, 34S, and a mold resin portion 35. That is, the rotor 30 has the plurality of permanent magnets 33A, 33B, the plurality of core piece parts 34N, 34S, and the mold resin portion 35. The rotor body unit 32 is formed by molding, for example, in which the core piece parts 34N, 34S and the permanent magnets 33A, 33B are arranged in a mold and then resin is inserted therein.

The mold resin portion 35 is disposed between the plurality of core piece parts 34N, 34S. The mold resin portion 35 is made of resin. In this embodiment, the plurality of core piece parts 34N, 34S are retained by the mold resin portion 35.

Also, herein, the description that the mold resin portion is disposed between the plurality of core piece parts, includes the case that at least a portion of the mold resin portion is located on a line that connects any two core piece parts of the plurality of core piece parts. The two core piece parts of the plurality of core piece parts are not particularly limited, and they may be two circumferentially neighboring core piece parts, or two core piece parts that face each other in the radial direction across the shaft 31.

The permanent magnets 33A, 33B magnetize the core piece parts 34N, 34S. In this embodiment, the core piece parts 34N, 34S are made of a stack of laminated steel plates which is formed by laminating a plurality of electromagnetic steel plates. The electromagnetic steel plate is a type of magnetic material. The permanent magnet 33A and the permanent magnet 33B are alternately arranged in the circumferential direction. The permanent magnets 33A, 33B are respectively disposed between the core piece parts 34N, 34S in the circumferential direction.

The permanent magnets 33A, 33B respectively have two magnetic poles arranged in the circumferential direction. The permanent magnet 33A has, for example, the N-pole on the driving side (+θZ side), and the S-pole on the counter driving side (−θZ side). The permanent magnet 33B has, for example, the S-pole on the driving side (+θZ side), and the N-pole on the counter driving side (−θZ side). Accordingly, the magnetic poles of the circumferentially neighboring permanent magnets 33A, 33B are arranged such that magnetic poles with identical polarity face each other in the circumferential direction.

The permanent magnet 33A and the permanent magnet 33B are configured in the same way, except that their arrangement of the magnetic poles in the circumferential direction is different from each other. For this reason, in the following descriptions, the permanent magnet 33A may be sometimes explained as a representation of the permanent magnets, and explanations related to the permanent magnet 33B may be omitted.

As shown in FIG. 3, the permanent magnet 33A is, for example, in direct contact with the core piece part 34N and the core piece part 34S which are disposed respectively on both sides in the circumferential direction. As a result, the permanent magnet 33A is securely attached to the core piece part 34N and the core piece part 34S by magnetic force. The permanent magnet 33A extends in the radial direction. The shape of the cross section perpendicular to the axial direction (Z-axis direction) of the permanent magnet 33A is, for example, quadrangular. As shown in FIG. 2, the number of the permanent magnet 33A provided in this embodiment is, for example, seven. The number of the permanent magnet 33B is also, for example, seven. That is, the number of the permanent magnet 33A is identical to that of the permanent magnet 33B. The number of the permanent magnets 33A, 33B may be appropriately altered in accordance with the specification of the motor.

The core piece parts 34N, 34S are arranged along the circumferential direction at a radially outer side of the shaft 31. The core piece part 34N and the core piece part 34S are alternately arranged along the circumferential direction. The core piece part 34N is disposed between the N-pole of the permanent magnet 33A and the N-pole of the permanent magnet 33B. Accordingly, the core piece part 34N is magnetized to the N-pole. The core piece part 34S is disposed between the S-pole of the permanent magnet 33A and the S-pole of the permanent magnet 33B. Accordingly, the core piece is magnetized to the S-pole.

In this embodiment, the core piece parts 34N, 34S are connected to each other only by the mold resin portion 35. That is, other than the mold resin portion 35, the rotor 30 does not have any other portion to connect the core piece parts 34N, 34S to each other, and the core piece parts 34N, 34S are separated. Accordingly, when the mold resin portion 35 is formed by molding, for example, the resin easily flows between the core piece parts 34N, 34S. Also, the magnetic flux in the core piece parts 34N, 34S can be inhibited from leaking to a radially inside of the core piece parts 34N, 34S.

The number of the core piece part 34N provided in this embodiment is, for example, seven. The number of the core piece 34S is also, for example, seven. That is, the number of the core piece part 34N and the number of the core piece part 34S are identical. The number of the permanent magnets 33A, 33B is identical to the number of the core piece parts 34N, 34S. Further, the number of the core piece parts 34N, 34S may be appropriately altered, as long as they match the number of the permanent magnets 33A, 33B.

The core piece part 34N and the core piece part 34S are configured in the same way, except that they are magnetized to have different polarities. For this reason, in the following descriptions, the core piece part 34N may be sometimes explained as a representation of the core piece parts, and the core piece part 34S may not be explained in detail.

As shown in FIG. 3, the core piece part 34N has a substantially fan shape, in which the circumferential width thereof increases from a radially inner side toward a radially outer side. Corner parts on a radially outer side of the core piece part 34N are, for example, chamfered in both circumferential directions. The chamfering may be angular chamfering or round chamfering. In the example shown in FIG. 3, the corner parts on the radially outer side of the core piece parts 34N are angular-chamfered.

The core piece part 34N has a concave portion 36, and two protrusion portions. The two protrusion portions respectively have a driving side protrusion 37 and a counter driving side protrusion 38. The concave portion 36 is a portion where a surface on a radially inner side of the core piece part 34N is recessed toward a radially outer side. When viewed in the axial direction, the concave portion 36 has a shape in which the circumferential width thereof is reduced from a radially inner side toward a radially outer side.

The driving side protrusion 37 and the counter driving side protrusion 38 are disposed on both circumferential sides of the concave portion 36, respectively. More specifically, the driving side protrusion 37 is disposed on the driving side (+θZ side) of the concave portion 36. The counter driving side protrusion 38 is disposed on the counter driving side (−θZ side) of the concave portion 36. The driving side protrusion 37 is adjacent to the counter driving side protrusion 38 via the concave portion 36.

The driving side protrusion 37 and the counter driving side protrusion 38 respectively protrude radially inward along each of the neighboring permanent magnets 33A, 33B. More specifically, the driving side protrusion 37 protrudes radially inward along the side surface of the permanent magnet 33A adjacent to the driving side (+θZ side) of the core piece part 34N. The counter driving side protrusion 38 protrudes radially inward along the side surface of the permanent magnet 33B adjacent to the counter driving side (−θZ side) of the core piece part 34N.

A first driving side protrusion lateral surface 37a is a surface of the driving side protrusion 37 which faces the permanent magnet 33A in the circumferential direction. A magnet counter driving side surface 33Aa is a surface of the permanent magnet 33A which faces the core piece part 34N in the circumferential direction. The first driving side protrusion lateral surface 37a is substantially parallel to the magnet counter driving side surface 33Aa. The first driving side protrusion lateral surface 37a is in contact with the magnet counter driving side surface 33Aa. A first counter driving side protrusion lateral surface 38a is a surface of the counter driving side protrusion 38 which faces the permanent magnet 33B in the circumferential direction. A magnet driving side surface 33Ba is a surface of the permanent magnet 33B which faces the core piece part 34N in the circumferential direction. The first counter driving side protrusion lateral surface 38a is parallel to the magnet driving side surface 33Ba. The first counter driving side protrusion lateral surface 38a is in contact with the magnet driving side surface 33Ba.

For example, within the core piece part 34N, a magnetic flux passing through the permanent magnet 33A and the core piece part 34N and a magnetic flux passing through the permanent magnet 33B and the core piece part 34N are in close proximity. For this reason, within the core piece part 34N, there exist a magnetic flux that flows toward a radially outer side of the core piece part 34N from the permanent magnets 33A, 33B through the core piece part 34N, and a magnet flux that flows toward a radially inner side of the core piece part 34N from the permanent magnets 33A, 33B through the core piece part 34N. That is, within the core piece part 34N, there may exist a magnetic path extending to a radially outer side of the core piece part 34N from the permanent magnets 33A, 33B through the core piece part 34N, and a magnetic path extending to a radially inner side of the core piece part 34N from the permanent magnets 33A, 33B through the core piece part 34N. The magnetic path extending to a radially inner side of the core piece part 34N is likely to occur at a portion closer to a radially inner side of the core piece part 34N.

The magnetic flux extending to a radially inner side of the core piece part 34N passes through a radially inner side of the permanent magnet 33A or a radially inner side of the permanent magnet 33B, and extends to the neighboring core piece part 34S. The magnetic flux which passes through this magnetic path, that is, the magnetic flux which passes through a radially inner side of the permanent magnet 33A or a radially inner side of the permanent magnet 33B, and flows in between the neighboring core pieces 34N, 34S, does not contribute to the generation of torque, and neither to the rotation of the rotor 30. That is, among the magnetic flux of the permanent magnets 33A, 33B, the proportion that does not contribute to the generation of torque increases.

As to the specific flows of the magnetic fluxes in the core peace part 34N of this embodiment, for example, the magnetic fluxes emitted from the N-poles of the permanent magnets 33A, 33B facing the core piece part 34N are in close proximity inside the core piece part 34N. The flows of the magnetic fluxes that are in close proximity avoid each other and flow toward a radially outer side of the core piece part 34N, or a radially inner side of the core piece part 34S. Also, the magnetic flux in the core piece 34S flows in the reverse direction of the magnetic flux in the core piece part 34N.

In addition, in the following descriptions, the magnetic path which passes through a radially inner side of the permanent magnet 33A or a radially inner side of the permanent magnet 33B, and connects the neighboring core piece parts 34N, 34S may be referred to as the magnetic path passing through a radially inner side of the permanent magnets 33A, 33B. Also, herein, the magnetic flux which flows in the magnetic path passing through a radially inner side of the permanent magnets 33A, 33B may be referred to as the leakage flux.

According to this embodiment, the concave portion 36 is provided on the inside surface of the core piece part 34N. Also, the driving side protrusion 37 and the counter driving side protrusion 38 are provided on both sides of the concave portion 36 in the circumferential direction, respectively. For this reason, the magnetic flux passing through the permanent magnet 33A and the driving side protrusion 37 and the magnetic flux passing through the permanent magnet 33B and the counter driving side protrusion 38 can be inhibited from approaching each other at a portion where the concave portion 36 is provided, that is, at a portion closer to a radially inner side of the core piece part 34N. Accordingly, the formation of a magnetic path which passes through a radially inner side of the permanent magnets 33A, 33B can be suppressed. As a result, according to this embodiment, the leakage flux in the rotor 30 can be reduced.

In this embodiment, a segment which connects an end portion P1 on a radially inner side of the first driving side protrusion lateral surface 37a and an end portion P2 on a radially outer side of the concave portion 36 is referred to as a first segment S1. When viewed from the axial direction, the driving side protrusion 37 has a protruding inner portion 37c which is a portion disposed on a radially inner side from the first segment S1.

For example, when the circumferential width of the driving side protrusion 37 and the circumferential width of the counter driving side protrusion 38 are relatively small, there is possibility that magnetic saturation may occur in the driving side protrusion 37 and the counter driving side protrusion 38. As a result, there is a possibility that the magnetic flux is easily leaked radially inward from the driving side protrusion 37 and the counter driving side protrusion 38, so that the leakage flux cannot be sufficiently reduced.

To the contrary, according to this embodiment, the circumferential width of the core piece part 34N, that is, the circumferential width of the driving side protrusion 37 can be made relatively bigger at a portion closer to a radially inner side of the core piece part 34N, by providing the protruding inner portion 37c. With this, magnetic saturation is inhibited from occurring in the driving side protrusion 37. Accordingly, the magnetic flux can be inhibited from leaking radially inward from the driving side protrusion 37. Thus, according to this embodiment, the motor 10 having a structure capable of reducing leakage flux is obtained.

When viewed in the axial direction, the counter driving side protrusion 38 has a protruding inner portion 38c which is a portion disposed on a radially inner side from a segment connecting an end portion on a radially inner side of the first counter driving side protrusion lateral surface 38a and an end portion P2 on a radially outer side of the concave portion 36. Accordingly, the magnetic flux can be inhibited from leaking radially inward from the counter driving side protrusion 38. Thus, according to this embodiment, the motor 10 having a structure capable of further reducing leakage flux is obtained.

A first curve portion 38e, a second curve portion 38f, and a linear portion 38d are provided to the exterior of a second counter driving side protrusion lateral surface 38b, which is a surface on the concave portion 36 side (+θZ side) of the counter driving side protrusion 38, when viewed in the axial direction.

The first curve portion 38e is a curved portion located at an end portion of a radially inner side of the counter driving side protrusion 38. For this reason, when the rotor body unit 32 is molded, the resin may easily flow in between the counter driving side protrusion 38 and the driving side protrusion 37, that is, into the concave portion 36. The center of curvature of the first curve portion 38e is located at a radially outer side than the first curve portion 38e.

The second curve portion 38f is a curved portion located at an end portion on a radially outer side of the counter driving side protrusion 38. For this reason, when the rotor body unit 32 is molded, the resin may easily flow in between the counter driving side protrusion 38 and the driving side protrusion 37, that is, into the concave portion 36. The center of curvature of the second curve portion 38f is located at a radially inner side than the second curve portion 38f.

The linear portion 38d is a straight-lined portion connecting the first curve portion 38e and the second curve portion 38f. For this reason, for example, it is easier to form a mold for punching out the core piece part 34N, when compared to the case in which the entire contour of the second counter driving side protrusion lateral surface 38b has a curved shape.

The linear portion 38d is inclined in a direction away from the magnet driving side surface 33Ba of the permanent magnet 33B, as it goes toward a radially outer side from a radially inner side. For this reason, the magnetic path which passes through the permanent magnet 33B and the counter driving side protrusion 38 can easily become a magnetic path which extends to a radially outer side of the core piece part 34N along the linear portion 38d. Accordingly, the formation of a magnetic path which passes through a radially inner side of the permanent magnets 33A, 33B can be suppressed. As a result, the leakage flux in the rotor 30 can be reduced.

In this embodiment, a first curve portion 38*e*, a second curve portion 38*f*, and a linear portion 38*d* are also provided to the exterior of a second driving side protrusion lateral surface 37*b*, which is a surface on the concave portion 36 side (−θZ side) of the driving side protrusion 37, in the same manner as the counter driving side protrusion 38. Accordingly, identical effects to the effects by the first curve portion 38*e*, the second curve portion 38*f* and the linear portion 38*d* can also be acquired for the driving side protrusion 37. Therefore, the detailed descriptions thereof are omitted herein.

In this embodiment, the two protrusions, that is, the driving side protrusion 37 and the counter driving side protrusion 38 are, for example, axisymmetric with respect to a radial line RL1 which passes through the circumferential center of the core piece part 34N.

For this reason, it is possible to equally increase the circumferential width of the driving side protrusion 37 and the circumferential width of the counter driving side protrusion 38. Therefore, it is easy to further inhibit the occurrence of magnetic saturation in the driving side protrusion 37 and the counter driving side protrusion 38. Accordingly, the magnetic flux can be inhibited from leaking from the driving side protrusion 37 and the counter driving side protrusion 38.

Since the driving side protrusion 37 and the counter driving side protrusion 38 are axisymmetric, the magnetic flux flowing through the driving side protrusion 37 and the magnetic flux flowing through the counter driving side protrusion 38 are also axisymmetric with respect to the radial line RL1. For this reason, the effects of the magnetic flux which the core piece part 34N applies on the stator 40 can be inhibited from being unbalanced in the circumferential direction of the core piece part 34N. As a result, the rotation of the rotor 30 can be stabilized.

An end portion on a radially inner side of the driving side protrusion 37 is located at a radially outer side than an end portion on a radially inner side of the permanent magnet 33A. For this reason, the distance from the end portion on a radially inner side of the driving side protrusion 37 to reach the core piece part 34S located on the driving side (+θZ side) of the permanent magnet 33A through a radially inner side of the permanent magnet 33A increases. Therefore, the magnetic flux can be inhibited from flowing in between the neighboring core piece parts 34N, 34S through a radially inner side of the permanent magnet 33A. Accordingly, in this embodiment, the leakage flux can be further reduced.

An end portion on a radially inner side of the counter driving side protrusion 38 is located at a radially outer side than an end portion on a radially inner side of the permanent magnet 33B. For this reason, as in the driving side protrusion 37, the magnetic flux can be inhibited from flowing in between the neighboring core piece parts 34N, 34S through a radially inner side of the permanent magnet 33B. Therefore, according to this embodiment, the leakage flux in the rotor 30 can be further reduced.

In this embodiment, the shortest segment which connects the end portions P3, P4 on a radially inner side of the circumferentially neighboring permanent magnets 33A, 33B is referred to as a second segment S2. The radial distance L1 from the end portion P2 on a radially outer side of the concave portion 36 to the second segment S2 is longer than the length L2 of the second segment S2. For this reason, the radial width of the concave portion 36 can be longer. Therefore, the magnetic flux can be inhibited from approaching a portion closer to a radially inner side of the core piece part 34N. Thus, according to this embodiment, the leakage flux in the rotor 30 can be further reduced.

Further, the present embodiment may additionally employ the following constitutions.

In this embodiment, the driving side protrusion 37 and the counter driving side protrusion 38 may not be axisymmetric with respect to the radial line RL1. In this case, only one of the protruding inner portion 37*c* or the protruding inner portion 38*c* may be provided.

Also, the shapes of the concave portion 36, the driving side protrusion 37 and the counter driving side protrusion 38 may not be limited to a particular shape, as long as a protruding inner portion, that is, the protruding inner portion 37*c* or the protruding inner portion 38*c* may be formed on respective one of the two protrusions.

In addition, the linear portion 38*d* may be parallel to the magnet driving side surface 33Ba of the permanent magnet 33B, or may be inclined in a direction approaching the magnet driving side surface 33Ba, as it goes toward a radially outer side from a radially inner side.

Further, an end portion on a radially inner side of the driving side protrusion 37 may be located at an identical position as the end portions of the permanent magnets 33A, 33B in the circumferential direction, or at a radially inner side than the end portions of the permanent magnets 33A, 33B. The same applies to the counter driving side protrusion 38.

Furthermore, the distance L1 may be equal to or smaller than the length L2.

Figure 4:
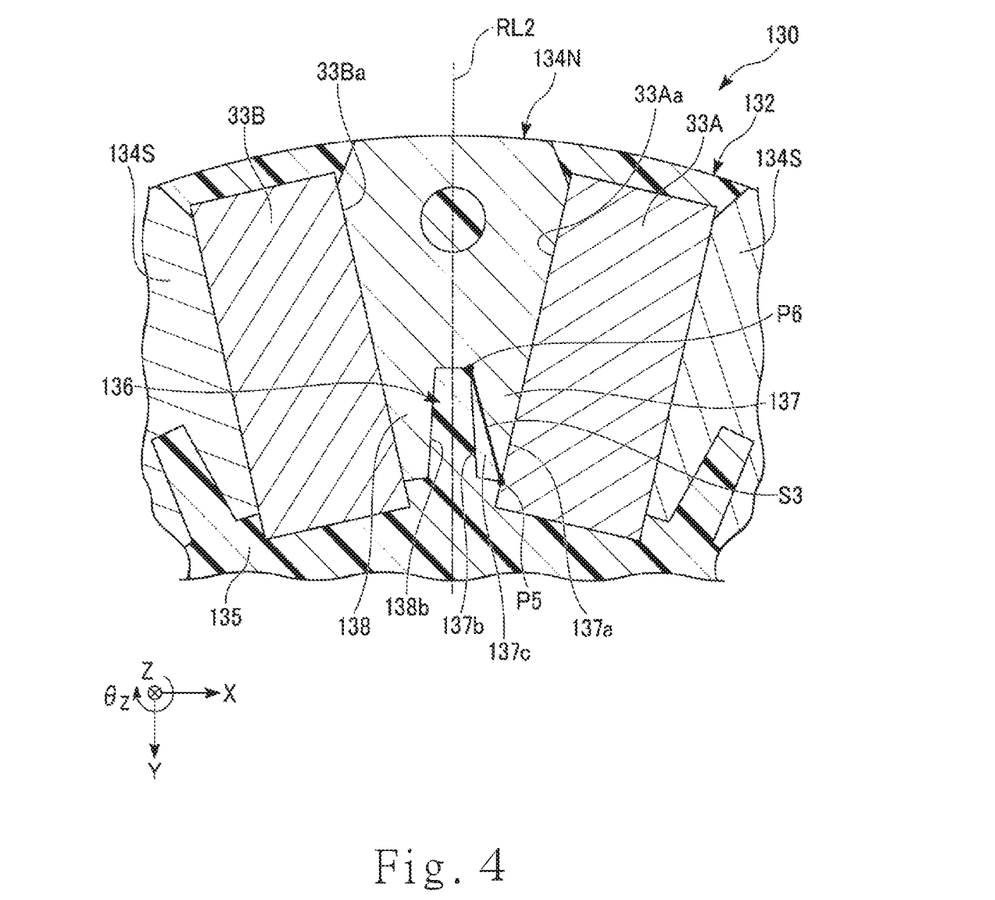
FIG. 4 is a partially enlarged view which illustrates another example of a rotor according to the embodiment.

Moreover, the present embodiment may also employ the configuration as shown in FIG. 4. FIG. 4 is a partially enlarged cross-sectional view of another example of a rotor 130. As shown in FIG. 4, the rotor 130 has a rotor body unit 132. The rotor body unit 132 has a plurality of permanent magnets 33A, 33B, a plurality of core piece parts 134N, 134S, and a mold resin portion 135. The mold resin portion 135 is identical to the mold resin portion 35 shown in FIG. 3.

The core piece part 134N has a concave portion 136, a driving side protrusion 137, and a counter driving side protrusion 138. In this configuration, the shape of the concave portion 136 is quadrangular, when viewed in the axial direction. Other structures of the concave portion 136 are identical to the concave portion 36 shown in FIG. 3.

In this configuration, a segment which connects an end portion P5 on a radially inner side of a first driving side protrusion lateral surface 137*a*, which is a surface facing the permanent magnet 33A of the driving side protrusion 137 in the circumferential direction, and an end portion P6 on a radially outer side of the concave portion 136 is referred to as a first segment S3. Here, the end portion on a radially outer side of the concave portion 136 is not limited to a single portion. In this case, the end portion P6 refers to the portion closest to the permanent magnet 33A among the end portions on a radially outer side of the concave portion 136.

When viewed in the axial direction, the driving side protrusion 137 has a protruding inner portion 137*c* which is a portion located at a radially inner side on the first segment S3. For this reason, the magnetic flux which is leaked from the driving side protrusion 137 can be reduced. The counter driving side protrusion 137 has the same configuration, and therefore detailed explanation is not repeated here.

When viewed in the axial direction, the contour of a second counter driving side protrusion lateral surface 138*b*, which is a surface on the concave portion 136 side (+θZ side) of the counter driving side protrusion 138, has a linear shape. For this reason, when compared to a case in which the contour of the second counter driving side protrusion lateral surface 138b includes a curved portion, it is easier to make the counter driving side protrusion 138 when manufacturing the motor. The second driving side lateral surface 137b, which is a surface on the concave portion 136 side (−θZ side) of the driving side protrusion 137, has the same contour, and therefore detailed explanation is not repeated here.

The driving side protrusion 137 and the counter driving side protrusion 138 are axisymmetric with respect to a radial direction line RL2 which passes through the circumferential center of the core piece part 134N. The core piece part 134S and the core piece part 134N are configured in the same way, except for the polarity in which they are magnetized. Other structures of the rotor 130 are identical to those of the rotor 30 shown in FIG. 1 to FIG. 3.

While embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor, comprising:
a rotor comprising a shaft having its center on a vertically extending center axis;
a stator which is disposed at a radially outer side of the rotor; and
a bearing which supports the shaft,
wherein the rotor comprises:
  a plurality of core piece parts which are arranged along a circumferential direction; and
  a plurality of permanent magnets which are respectively arranged between neighboring core piece parts in the circumferential direction and magnetize the core piece parts,
wherein the permanent magnets comprise two magnetic poles arranged along the circumferential direction, and the magnetic poles of the circumferentially neighboring permanent magnets being arranged such that magnetic poles with identical polarity face each other in the circumferential direction,
the core piece parts comprise a concave portion where a surface on a radially inner side is recessed toward a radially outer side, and two protrusions which are respectively disposed on both circumferential sides of the concave portion and protrude radially inward along each of the neighboring permanent magnets,
when a segment connecting an end portion on a radially inner side of a surface of the protrusions which faces the permanent magnet in the circumferential direction and an end portion on a radially outer side of the concave portion is set to a first segment, the protrusions have a portion located on a radially inner side from the first segment when viewed in an axial direction,
when viewed in the axial direction, the concave portion has a shape in which a circumferential width thereof is monotonically reduced from a radially inner side toward a radially outer side,
wherein, in each core piece part of the plurality of core piece parts, a contour of a surface on the concave portion side of one of the protrusions comprises:
  a first curve portion having a curve shape and located at the end portion on a radially inner side of the protrusion when viewed in the axial direction;
  a second curve portion which has a curve shape and is located on the end portion on a radially outer side of the protrusion when viewed in the axial direction; and
  a linear portion which has a linear shape and connects the first curve portion and the second curve portion when viewed in the axial direction.

2. The motor according to claim 1,
wherein the two protrusions are axisymmetric with respect to a radial line which passes through the circumferential center of the core piece parts.

3. The motor according to claim 1,
wherein the end portion on a radially inner side of the protrusion is located, with respect to a center of the rotor, at a radially outer position than a radially position of the end portion on a radially inner side of the permanent magnet.

4. The motor according to claim 1,
wherein when a shortest segment which connects two end portions on a radially inner side of the circumferentially neighboring permanent magnets is set to a second segment, a radial distance from the end portion on a radially outer side of the concave portion to the second segment is longer than a length of the second segment.

5. The motor according to claim 1, wherein a radial distance between the center axis and a surface on a radially outer side of the core piece part is same as a radial distance between the center axis and a surface on a radially outer side of the mold resin.

6. A motor, comprising:
a rotor comprising a shaft having its center on a vertically extending center axis;
a stator which is disposed at a radially outer side of the rotor; and
a bearing which supports the shaft,
wherein the rotor comprises:
  a plurality of core piece parts which are arranged along a circumferential direction; and
  a plurality of permanent magnets which are respectively arranged between neighboring core piece parts in the circumferential direction and magnetize the core piece parts,
wherein the permanent magnets comprise two magnetic poles arranged along the circumferential direction, and the magnetic poles of the circumferentially neighboring permanent magnets being arranged such that magnetic poles with identical polarity face each other in the circumferential direction,
the core piece parts comprise a concave portion where a surface on a radially inner side is recessed toward a radially outer side, and two protrusions which are respectively disposed on both circumferential sides of the concave portion and protrude radially inward along each of the neighboring permanent magnets, when a segment connecting an end portion on a radially inner side of a surface of the protrusions which faces the permanent magnet in the circumferential direction and an end portion on a radially outer side of the concave portion is set to a first segment, the protrusions have a portion located on a radially inner side from the first segment when viewed in an axial direction, when viewed in the axial direction, the concave portion has a shape in which a circumferential width thereof is monotonically reduced from a radially inner side toward a radially outer side;

wherein, in each core piece part of the plurality of core piece parts:
- a contour of a surface on the concave portion side of a first protrusion of the two protrusions comprises a first linear portion which has a linear shape;
- a contour of a surface on the concave portion side of a second protrusion of the two protrusions comprises a second linear portion which has a linear shape;
- a contour of a surface on the concave portion side of the core piece part comprises a third linear portion which has a linear shape;

wherein the third linear portion connects the first linear portion and the second linear portion.

\* \* \* \* \*